W. S. HARLEY.
FRICTION CLUTCH.
APPLICATION FILED OCT. 9, 1911.

1,020,199.

Patented Mar. 12, 1912.

4 SHEETS—SHEET 1.

Witnesses:
Conner Young.
May Downey.

Inventor:
William S. Harley
By Oliphant & Young
Attorneys.

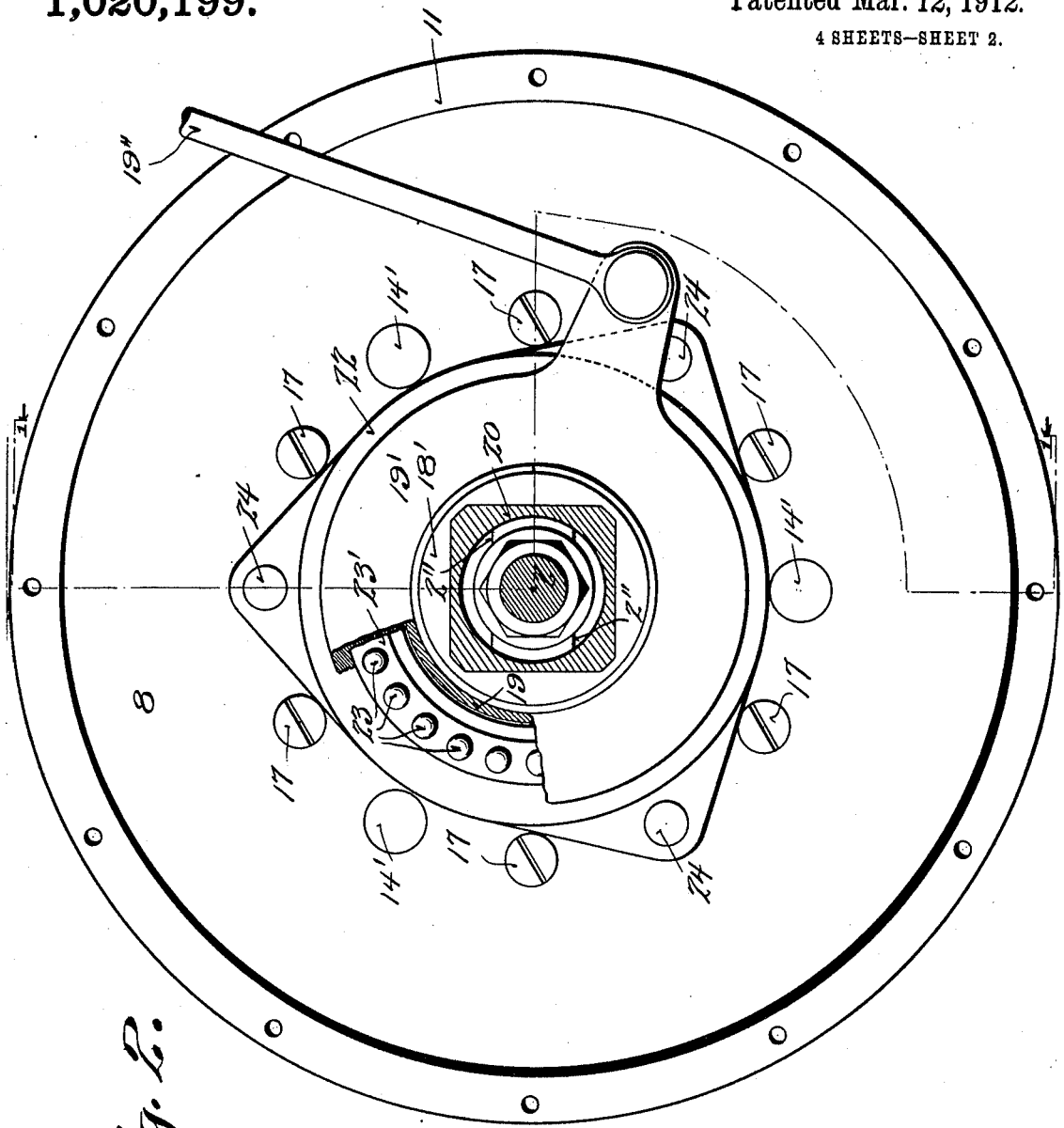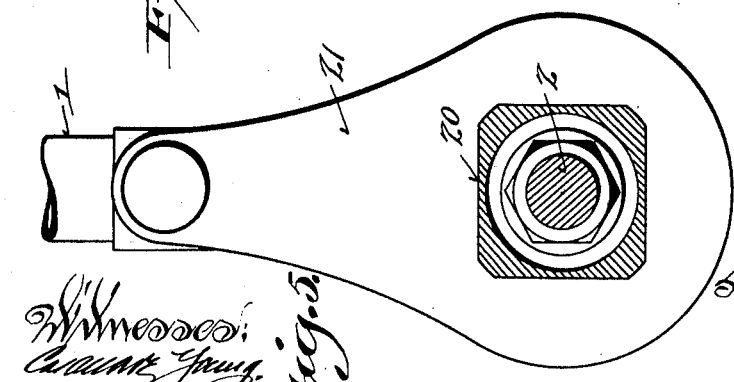

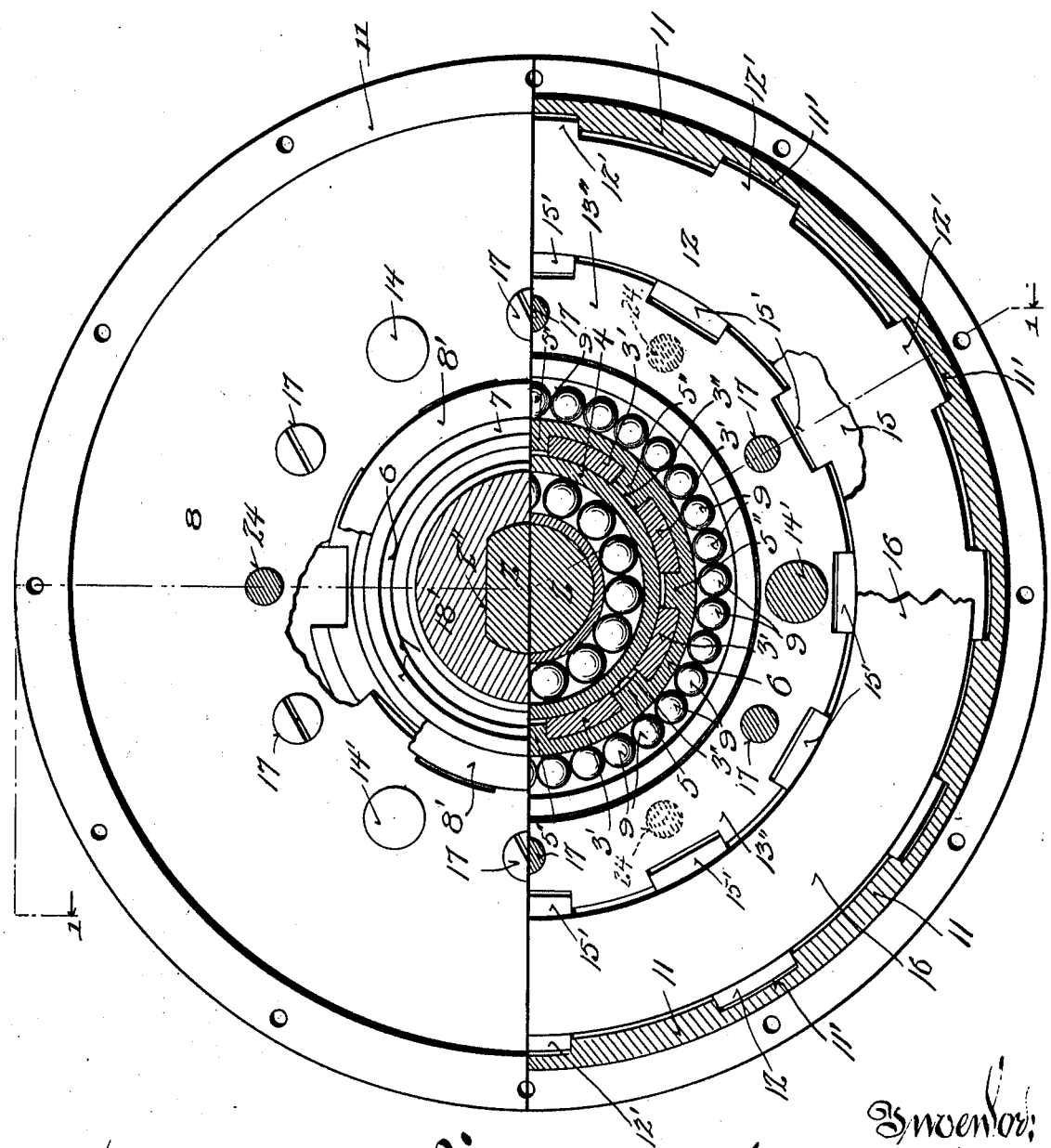

W. S. HARLEY.
FRICTION CLUTCH.
APPLICATION FILED OCT. 9, 1911.

1,020,199.

Patented Mar. 12, 1912.

4 SHEETS—SHEET 4.

Witnesses:
Rosamond Young
May Downey

Inventor:
William S. Harley
By Ephriam L. Young
Attorneys.

UNITED STATES PATENT OFFICE.

WILLIAM S. HARLEY, OF MILWAUKEE, WISCONSIN.

FRICTION-CLUTCH.

1,020,199.      Specification of Letters Patent.      Patented Mar. 12, 1912.

Application filed October 9, 1911. Serial No. 653,551.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Friction-Clutches; and I do hereby declare that the following is a full, clear, and exact description thereof.

My invention refers to clutches of the friction type, the object being to provide a simple, economical, positive and at the same time sensitive clutch of this character, the clutch being particularly designed to be applied to the wheel hub of a mortorcycle, it being understood that the same can be utilized economically in connection with any mechanism where it is desirable to connect and disconnect a drive and driven member manually and when applied to a motorcycle its purpose is to effect a free engine under manual control by the operator.

With the above object in view the invention consists in what is herein shown, described and claimed.

Figure 1:
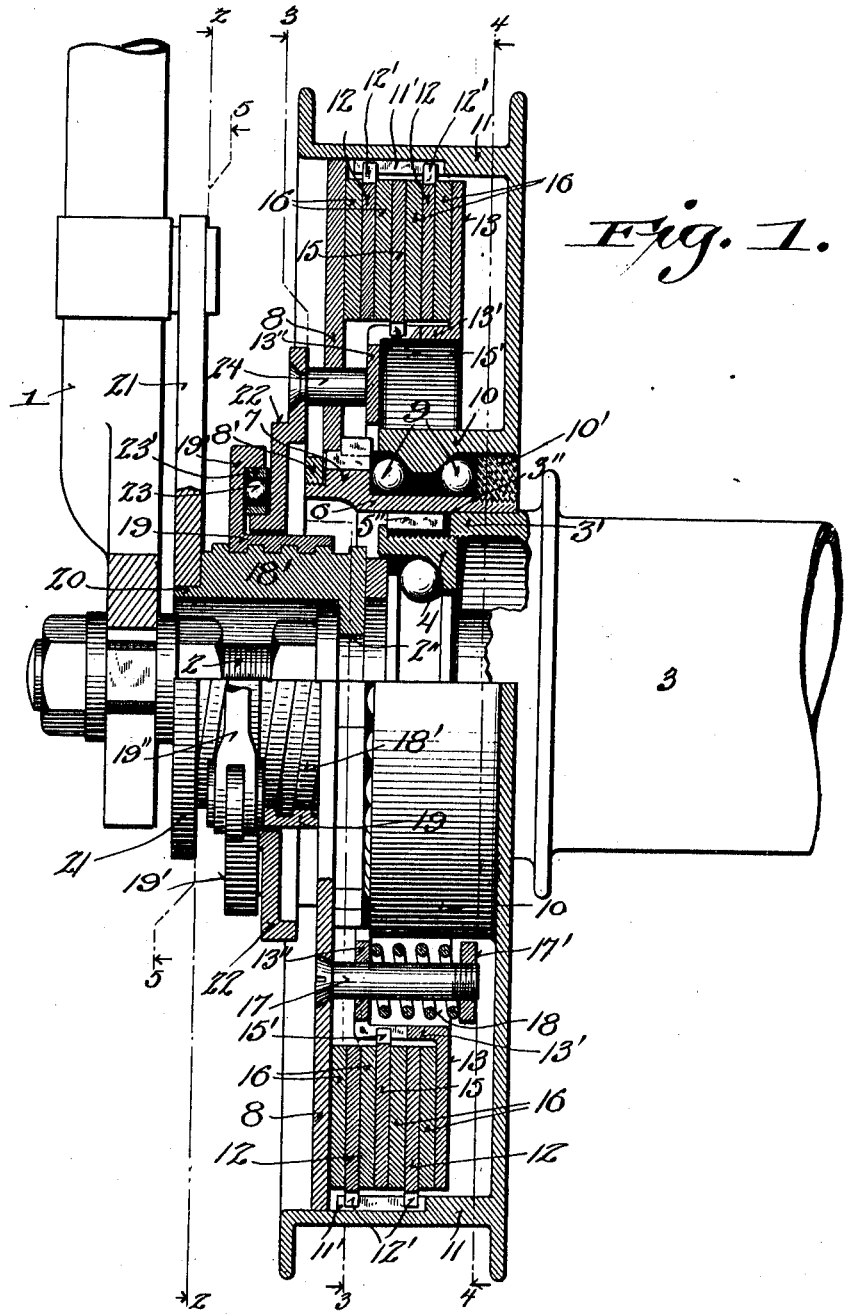
Figure 6:
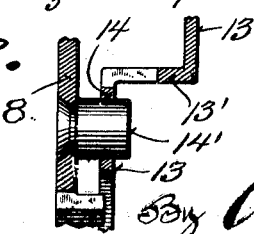
Figure 4:
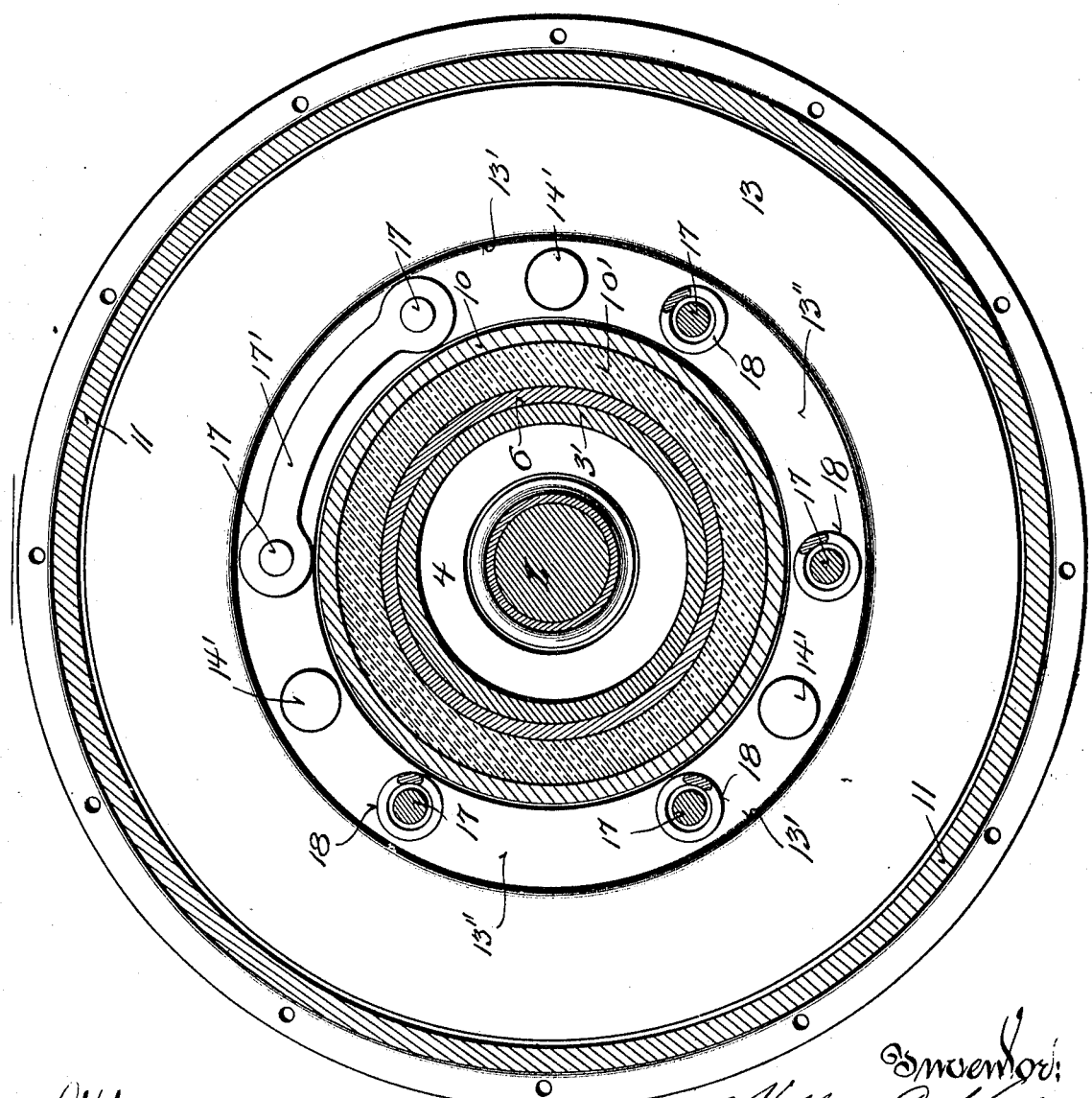

In the drawings Figure 1 represents a sectional elevation of a clutch mechanism embodying the features of my invention, the section being indicated by line 1—1 of Figs. 2 and 3; Fig. 2, a face view of the clutch mechanism, the view being partly in section as indicated by line 2—2 of Fig. 1, with parts broken away to more clearly show certain structural features; Fig. 3, a sectional face view of the clutch mechanism, the plane of the section being indicated by line 3—3 of Fig. 1; Fig. 4, a sectional face view looking from the reverse side, the section being indicated by line 4—4 of Fig. 1; Fig. 5, a detailed cross-section of the tie connection between the threaded sleeve and frame of the machine to which the clutch mechanism is attached, and Fig. 6, a detailed cross-section of the supporting connection between one of the clutch members and a gripping member.

Referring by characters to the drawings, 1 represents a fork member which forms part of the vehicle frame and in the end of which is secured a shaft 2, it being understood that the opposite end of said shaft is similarly supported in a fork member not shown. Journaled upon the shaft is a wheel-hub 3, the same being mounted upon a suitable ball-bearing mechanism of ordinary construction, whereby friction is eliminated, a ball-race 4 being in threaded union with the end portion 3' of the barrel of said hub. The end portion 3' of the barrel hub is provided with a series of notches 3" at intervals throughout its circumference for the reception of lugs 5 that form part of a collar 6 which is fitted over said barrel as best shown in Fig. 1, the lugs 5 being held against end-play in their seats by a flanged end of the ball-race 4 which overlaps the end of the barrel. The collar 6 has a notched right angular flange 7 for the reception of a correspondingly notched disk 8, which disk constitutes a clutch member, the collar forming a rigid supporting hub therefor. The disk is held in its seat with relation to the notched flange 7 by a spanner ring 8', which ring is in threaded union with a shoulder of the flange. It will be understood that the disk which constitutes the clutch member is thus rigidly secured to the wheel hub and by this detailed arrangement the same can readily be attached to a hub of standard type by simply notching the end of the barrel as previously mentioned. The outer face of the collar also forms a cup for a double series of anti-friction balls 9 which serve as bearings for the hub 10 that forms part of a shell 11 which is thus rotatably mounted upon the wheel hub, the double series of balls 9 being spaced apart by a circular internal rib of the hub 10, which hub is held against end play by a keeper ring 10' that is in threaded union with the inner end of the collar 8. In the illustrations shown the shell is designed to be used as a hub for a band pulley which is connected to said hub by a series of spokes not shown, it being understood that the wheel hub 3 is arranged to receive also a series of wire spokes that are connected to a wheel rim or tread not shown.

The internal circular face of the shell 11 is provided with a shoulder having a series of notches 11' therein for interlocked engagement with a pair of clutch rings 12, the same being provided with peripheral spurs 12' for engagement with the notches, whereby said clutch rings are adapted to rotate with the shell, but are capable of endwise movement relative thereto, the said clutch rings in conjunction with the sleeve 11 constituting a second clutch member which may be connected or disconnected from the first mentioned clutch member or disk 8 at the will of the operator by mechanism to be hereinafter described.

A gripping member in the form of a ring 13 is fitted within the shell 11, between which gripping member and the disk 8, the clutch rings 12 are interposed. The ring 13 is provided with a horizontal face 13' that is merged into a vertical apertured hub section 13'', the bore of which hub section is of such dimensions as to permit the same to play lengthwise over the hub 10 of the shell. The hub section 13'' is also provided with a series of apertures 14 for engagement with studs 14' that project from the inner face of the disk 8, the studs forming a connection between the gripping ring 13 and said disk 8 or clutch member. Thus it will be understood that the gripping ring or member 13 is arranged to rotate with the disk 8 but is capable of end play relative thereto.

A second gripping ring 15 is carried by the gripping ring 13, the bore of the same being arranged to fit over the horizontal face 13' of said gripping ring. The second gripping ring 15 is provided with a series of key-lugs 15' which are fitted into horizontally disposed key-seats that are formed in the face 13' of gripping ring 13 and hence it will be understood that the second gripping ring is supported by and rotated with the first named gripping ring, but is capable of endwise play upon the cupped hub of the same, which hub is formed by the horizontal face 13' and vertical hub section 13''. The second gripping ring 15 is interposed between the clutch rings 12, there being a series of idle clutch rings 16 interposed and alternating the disk 8, gripping rings 13, 15, and clutch rings 12, all of which latter form a plurality of gripping surfaces which connect or disconnect the two clutch members described, to wit: the disk 8 and rings 12.

The hub section 13'' of the gripping ring is provided with a second set of apertures through which extend bolts 17 that have their heads countersunk within apertures of the disk 8. These bolts are connected in pairs by tie-straps 17' which are in threaded engagement with the inner ends of said bolts and between which straps and the inner faces of the hub section 13'' are interposed coiled springs 18, the same being wound about the bolts and under suitable compression. It is apparent that the coiled springs as shown serve to draw the gripping plate 13 toward the disk 8 and thus lock the series of gripping disks whereby the two gripping members are secured together. The tension of the springs being regulated by adjustment of the bolts whereby the straps which are in threaded engagement therewith will be drawn in or out incidental to rotation of said bolts, it being apparent that owing to the fact that the bolts are loosely mounted within the disk that they will have no function as a support for the gripping ring 13 and hence the said ring is supported as previously stated by the studs 14' which serve as guides and retainers therefor.

A sleeve 18' is fitted over a flattened section 2'' of the shaft 2, the sleeve being provided with a slotted bore which is adapted to fit tightly upon the flattened section of the shaft whereby the sleeve is held against rotation. The outer face of the sleeve 18' is provided with threads for the reception of a nut 19 which is adapted to be manually oscillated. Owing to the fact that the twisting strain upon the sleeve in the operation of the clutch is considerable, the end of the sleeve is also held securely and to accomplish the desired result, the said sleeve end is provided with a squared shank 20, over which is fitted a key-lever 21 having its outer end secured to the fork member 1. Hence the sleeve is held rigidly at its outer and inner end and will thus effectually resist all twisting strain. The nut 19 is provided with a vertically disposed flange 19' from which extends an apertured ear that has connected thereto an operating rod 19''. This rod is adapted to be extended to any convenient location accessible to the operator and may be manipulated by a suitable lever not shown.

Just rearward of the nut flange there is loosely mounted a spreader plate 22, between which and the flange there is interposed a series of anti-friction balls 23' that are retained by a keeper-ring 23'. As best shown in Fig. 1, the spreader ring carries a series of thrust pins 24 which extend through apertures in the disk 8 and have their ends arranged to abut the hub section 13'' of the gripping ring 13 whereby said gripping ring is moved endwise in opposition to its spring control.

From the foregoing description it will be understood that when the nut is moved forwardly by the operating rod its threaded union with the sleeve will cause the same to move inwardly. This inward movement will be exerted upon the spreader-plate and the thrust pins of the latter will thus force the gripping member or ring 13 away from the disk 8 in opposition to the coiled springs, its hub section 13' being moved to the right, which movement is permitted by the bore in said hub section being telescoped over the hub 10 of the shell 11. The clutch members or rings being thus disconnected or spread, the clutch members will be freed from each other and in this instance the shell 11, together with its rings 12, being connected to the engine, will rotate freely while the wheel hub 3 and its connected clutch member will remain inactive. When the nut is operated in the reverse direction from that just mentioned it is apparent that the wheel hub, which is the driven clutch member will be locked by frictional engagement of the rings with the shell which is the drive clutch member and thus power is applied for driving purposes.

I claim:

1. A clutch comprising a shaft, a hub revolubly mounted thereon, a clutch member carried by the hub, a spring-pressed gripping member in slidable union with the clutch member, a hub revolubly mounted upon the first named hub, a second clutch member carried thereby and interposed between the first clutch member and gripping member, a non-rotary threaded shell disposed about the shaft, a rotary nut in threaded union with the shell, and a spreader for the spring-pressed gripping member carried by the first named clutch member engageable with the nut.

2. A clutch comprising a shaft, a wheel-hub revolubly mounted thereon, an apertured clutch disk, a shell provided with a hub loosely mounted upon the wheel-hub, rings carried by the shell, gripping rings in slidable engagement with the disk, bolts extending from the disk, coiled springs carried by the bolts for controlling the gripping rings, a non-rotary exteriorly threaded sleeve carried by the shaft, a nut mounted upon the sleeve, a spreader-plate carried by said disk under control of the nut, and thrust pins carried by the spreader-plate for controlling movement of the gripping rings in one direction.

3. A clutch comprising a wheel hub, a clutch disk carried by the hub, a shell journaled upon the hub, a pair of rings in slidable engagement with the shell, a second pair of spring-controlled gripping rings interposed between the shell rings, supporting means connecting the gripping rings and disk, idle friction rings interposed between the disk, shell rings and gripping rings, slidable thrust pins carried by the gripping disk for controlling movement of the gripping rings in one direction, a spreader-plate connecting the thrust pins, a non-rotary exteriorly threaded sleeve in axial alinement with the wheel-hub, a nut carried by the sleeve for engagement with the spreader-plate, and a manually controlled actuating means for the nut.

4. A clutch comprising a shaft, a notched end barrel hub revolubly mounted upon the shaft, a collar fitted upon the end of the barrel hub having lugs engageable with the barrel hub notches, a flange extending from the collar, an apertured disk secured to the flange, a hub shell revolubly mounted upon the collar, clutch rings carried by the shell, the clutch rings being in slidable union therewith, a gripping ring having an apertured hub section alined with the shell rings, a second gripping ring carried by the first named gripping ring and in slidable union therewith, idle rings interposed between the disk, shell rings and gripping rings, lugs extending from said disk engageable with hub apertures of the first mentioned gripping ring, bolts carried by the aforesaid disk extending through other apertures of the gripping ring hub, coiled springs surrounding the bolts, straps in threaded union with pairs of said bolts whereby the tension of the coiled springs is regulated, thrust pins in slidable union with apertures of the disk having ends engageable with the gripping ring hub section, a spreader-plate connecting the thrust pins, a non-rotatory exteriorly threaded sleeve carried by the shaft, a flanged nut engageable with the sleeve threads, anti-friction balls interposed between the nut flange and spreader-plate, and manually controlled actuating means for the nut.

In testimony that I claim the foregoing I have hereunto set my hand at Milwaukee in the county of Milwaukee and State of Wisconsin in the presence of two witnesses.

WILLIAM S. HARLEY.

Witnesses:
EDWIN F. CASPER,
E. J. MUELLER.